R. B. Douty,
Coal Screen.
No 38,569. Patented May 19, 1863.
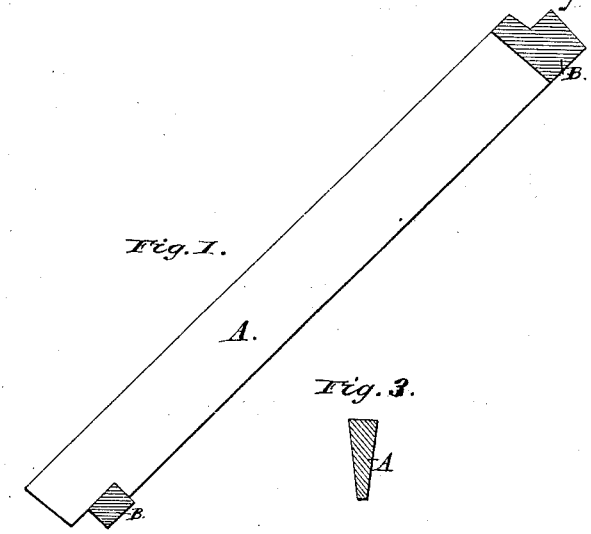
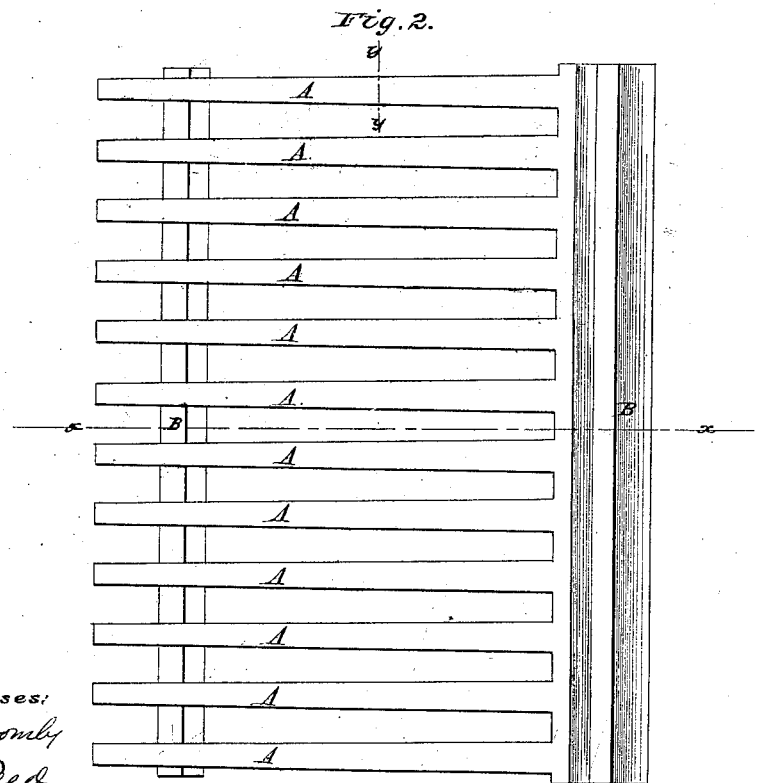
Witnesses:
J. W. Coombs
G. W. Reed
Inventor:
Richard B. Douty
per Munn & Co.
Attorneys

UNITED STATES PATENT OFFICE.

RICHARD B. DOUTY, OF SHAMOKIN, PENNSYLVANIA.

IMPROVEMENT IN COAL-SCREENS.

Specification forming part of Letters Patent No. 38,569, dated May 19, 1863.

*To all whom it may concern:*

Be it known that I, RICHARD B. DOUTY, of Shamokin, in the county of Northumberland and State of Pennsylvania, have invented a new and useful Improvement in Screens, designed more especially for screening coal; and I do hereby declare that the following is a full, clear, and exact description of the same, reference being had to the accompanying drawings, making a part of this specification, in which—

Figure 1 is a longitudinal vertical section of my invention, taken in the line $x\ x$, Fig. 2; Fig. 2, a plan or top view of the same; Fig. 3, a transverse vertical section of one of the bars of the same.

Similar letters of reference indicate corresponding parts in all the figures.

This invention consists in constructing the bars of the screen of taper form, the bars gradually diminishing in width from the upper to the lower end of the screen, and the spaces between the bars of course gradually increasing in width, as hereinafter fully shown and described, whereby the screen is effectually prevented from choking or clogging.

To enable those skilled in the art to fully understand and construct my invention, I will proceed to describe it.

A represents the bars of the screen, and B B the cross-pieces of the same. These may all be cast in one piece, if the screen be made of cast-iron. The bars A are of taper form in two different directions—to wit, longitudinally and transversely.

By referring to Fig. 2 it will be seen that the bars A gradually diminish in width from the upper to the lower end of the screen, and consequently the spaces between the bars A will correspondingly increase in width. By this arrangement it will be seen that the screen gradually becomes more open from its upper to its lower end. The bars A are also of taper form in their transverse section, gradually diminishing in width from their upper to their bottom surfaces, as shown in Fig. 3. By this means the spaces between the bars gradually widen from the upper to the bottom surface of the screen. From this description it will be seen that the screen cannot be choked up or clogged, as a free passage is allowed for the substances to pass through the screen, and the coal, if that be the substance to be screened, will not catch between the bars, as it will naturally slip down the screen, owing to the gradually-increasing width of the spaces between the bars. The ordinary screens which are provided with parallel bars are very liable to choke up in consequence of the coal becoming wedged between the bars of the screen. Lumps of wedge shape will become firmly bound between the bars and serve as an obstruction to other lumps passing down the screen, as well as to dust and fine particles of coal which would otherwise pass through it.

I am aware that screens have been constructed with bars of taper form in their transverse section, but not, so far as I am aware, with bars of taper form longitudinally. I do not claim, therefore, the first-named feature; but,

Having thus described my invention, I do claim as new and desire to secure by Letters Patent, as an improved article of manufacture—

A screen having its bars A of taper form longitudinally or in the direction of their length, as herein set forth.

RICHARD B. DOUTY.

Witnesses:
WM. H. DOUTY,
WM. R. KUTZNER.